(12) United States Patent
Minyard

(10) Patent No.: US 7,513,249 B2
(45) Date of Patent: Apr. 7, 2009

(54) DEVICE AND METHOD FOR REMOVING COOKING GREASE FROM COOKER EXHAUST AIR

(76) Inventor: Millard Minyard, 17421 Cambridge Ave., Tinley Park, IL (US) 60477

( * ) Notice: Subject to any disclaimer, the term of this patent is extended or adjusted under 35 U.S.C. 154(b) by 0 days.

(21) Appl. No.: 11/495,422

(22) Filed: Jul. 28, 2006

(65) Prior Publication Data

US 2007/0023030 A1    Feb. 1, 2007

Related U.S. Application Data

(60) Provisional application No. 60/703,485, filed on Jul. 28, 2005.

(51) Int. Cl.
*F24C 15/20* (2006.01)

(52) U.S. Cl. .................... 126/299 D; 126/299 R

(58) Field of Classification Search ............. 126/299 D, 126/299 R; 454/49; 104/52; 62/345, 600, 62/606; 95/290; 425/74; 96/190, 199; 55/360
See application file for complete search history.

(56) References Cited

U.S. PATENT DOCUMENTS

| | | | | |
|---|---|---|---|---|
| 2,793,712 A | * | 5/1957 | Graswich et al. | .............. 55/404 |
| 2,911,796 A | * | 11/1959 | Rogak | ............................. 62/98 |
| 3,159,563 A | * | 12/1964 | Anastasoff et al. | ............ 208/30 |
| 4,122,834 A | * | 10/1978 | Jacobs | .................... 126/299 D |
| 5,671,726 A | * | 9/1997 | Hsu | ....................... 126/299 D |
| 7,048,777 B2 | * | 5/2006 | Sauer | ............................ 95/14 |
| 2005/0072186 A1 | * | 4/2005 | Amin et al. | ................... 62/601 |

* cited by examiner

*Primary Examiner*—Kenneth B Rinehart
*Assistant Examiner*—Chuka C Ndubizu
(74) *Attorney, Agent, or Firm*—Cherskov & Flaynik

(57) ABSTRACT

A device 10 for removing cooking grease from cooker exhaust air includes a rotating chiller member 12, a stationary diffuser member 14 having a plurality of apertures 16 therethrough, the diffuser member 14 encasing the rotating chiller member 12, an enclosure 18 for enclosing the diffuser member 14 and the rotating chiller member 12 encased in the diffuser member 14, a mixing member 19 for combining grease carrying cooker exhaust air with cooling air provided by an air damper 20 secured to a first end portion 21 of the mixing member 19, a blower 22 for urging the combined grease carrying cooker exhaust air and cooling air from the mixing member 19 through the apertures 16 of the diffuser member 14, a refrigeration unit 24 for cooling the rotating chiller member 12 such that grease will condense from the cooker exhaust air upon the surface of the chiller member 12, and a scraper member 32 for removing grease from the chiller member 12 while the chiller member 12 is rotating. The device 10 ultimately removes grease from cooker exhaust air and returns grease free cooker exhaust air to the atmosphere.

23 Claims, 3 Drawing Sheets

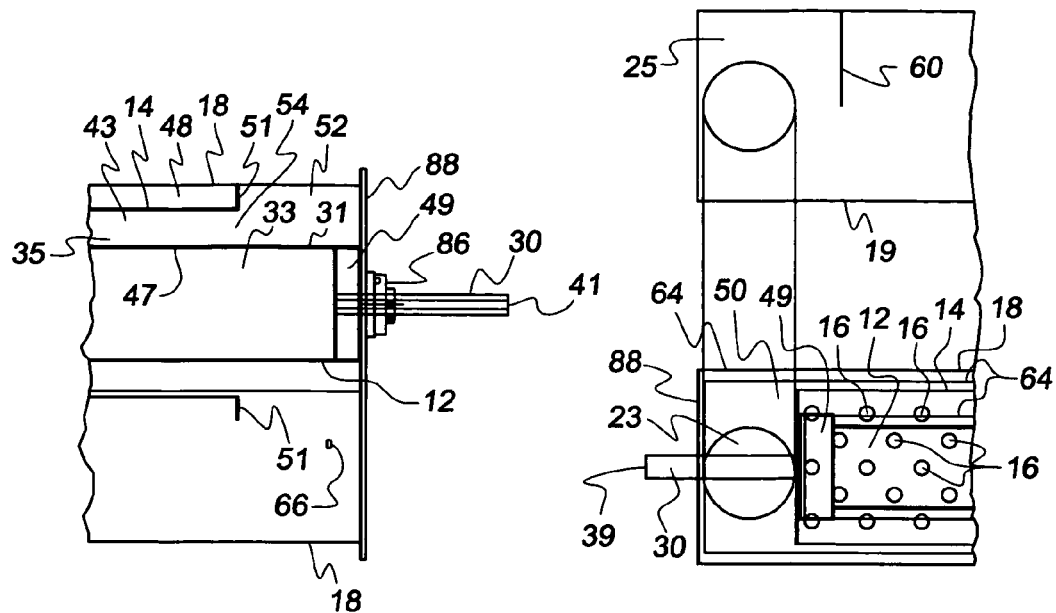
Fig. 5
Fig. 6
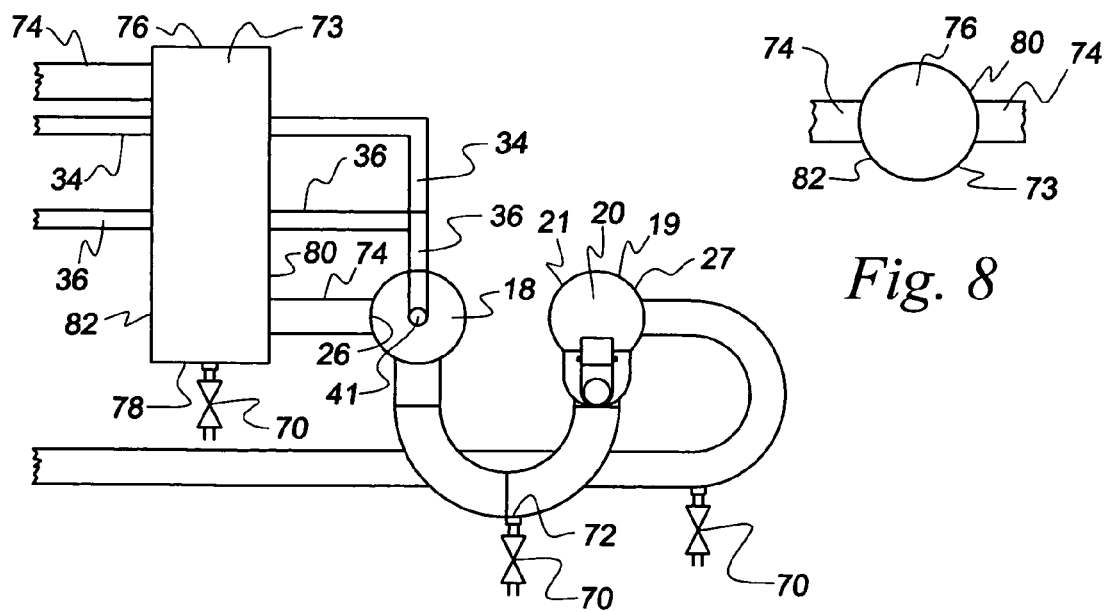
Fig. 7
Fig. 8

DEVICE AND METHOD FOR REMOVING COOKING GREASE FROM COOKER EXHAUST AIR

This application is based on Provisional Application Ser. No. 60/703,485, filed on Jul. 28, 2005.

BACKGROUND OF THE INVENTION

1. Field of the Invention

The present invention relates generally to removing grease from cooker exhaust air and, more particularly, to urging cooker exhaust air to engage a substantially cold surface to facilitate the condensation of grease upon the cold surface, thereby promoting the return of grease free air to the atmosphere.

2. Background of the Prior Art

Restaurants and other commercial users of cooking grease release large quantities of grease laden air to the atmosphere during the cooking process. In densely populated areas, the grease ultimately deposits upon and damages adjacent structures. An increasing number of planning departments for relatively small communities are requiring the removal of grease from grease laden air before the air is returned to the atmosphere.

Prior art devices and methods have utilized hot "after burners" to incinerate the grease in grease laden air, or have included "water misters" to condense the grease from the air. The problem with hot after burners is that the cost of the fuel to operate the after burners at the required temperatures is prohibitively expensive. The problem with water misters is that only a relatively small portion of grease is condensed from the air, thereby allowing substantial amounts of grease to be returned to the atmosphere.

A need exists for a device and method that removes substantially all the grease from grease laden cooking exhaust air, and at a relatively low cost.

SUMMARY OF THE INVENTION

It is a principle object of the present invention to provide a device for removing cooking grease from cooker exhaust air. A feature of the device is a cylindrically configured chiller member that engages cooker exhaust air, the chiller member having a cavity therein that allows a cooling material to flow through the chiller member. Another feature of the device is that the chiller member is rotated such that its axis of rotation is horizontally disposed. An advantage of the device is that grease from the cooker exhaust air condenses upon an outer cylindrical wall of the chiller member. Another advantage of the device is that the condensed grease is quickly removed from the rotating chiller member.

Another object of the present invention is to provide a device that distributes the cooker exhaust air over the entire surface of chilled outer cylindrical wall of the chiller member. A feature of the device is a stationary, cylindrically configured diffuser member or shell that concentrically encases the rotating chiller member such that an inner cylindrical wall of the diffuser member has a diameter relatively larger than the diameter of the outer cylindrical wall of the chiller member. Another feature of the device is a plurality of randomly disposed apertures through the relatively "thin" cylindrical shell of the diffuser member. An advantage of the device is that the diameters of the inner cylindrical wall of the diffuser and the outer cylindrical wall of the chiller member, together with the plurality of randomly disposed apertures cooperate to distribute or "spread" the cooker exhaust air over the outer cylindrical wall of the chiller member, thereby maximizing the quantity of grease condensed upon the chiller member per unit of time, while minimizing the quantity of cooling fluid and corresponding costs to cool the chiller member during the same time period.

Yet another object of the present invention is to provide a device that directs grease laden cooker exhaust air such that all apertures of the diffuser member receives grease laden cooker exhaust air therethrough. A feature of the device is a cylindrically configured enclosure that concentrically encases the stationary diffuser member and the rotating chiller member therein. Another feature of the device is a first aperture in a first end portion of the enclosure, and a second aperture in an opposite second end portion of the enclosure, the enclosure and the first aperture cooperating to supply grease laden cooker exhaust air to only an outer cylindrical wall of the diffuser member, the enclosure and the second aperture cooperating to allow grease free cooker exhaust air to exit from a cavity formed between the cylindrical inner wall of the diffuser and the outer cylindrical wall of the chiller member. An advantage of the device is that the grease laden cooker exhaust air is forced to flow through all the apertures of the diffuser member to ultimately engage the chilled cylindrical outer wall of the chiller member, whereupon, grease condenses upon the outer wall of the chiller member and grease free cooker exhaust air is forcibly discharged to the atmosphere.

Still another object of the present invention is to provide a device that cools the cooker exhaust air before the air engages the chiller member. A feature of the device is a mixing member for combining grease carrying or laden cooker exhaust air with cooling or atmospheric air, the cooker exhaust air entering the mixing member at a mid-portion and the cooling air entering the mixing member at a first end portion. Another feature of the device is a plurality of staggered baffle plates disposed between the mid-portion and a second end portion of the mixing member. An advantage of the device is that the staggered baffle plates forces the combined grease laden cooker exhaust air and cooling air to become more turbulent than laminar, thereby facilitating a lower cooker exhaust air temperature and correspondingly reducing the amount of cooling fluid (and money) required to condense grease from the cooker exhaust air.

Another object of the present invention is to provide a device that collects grease removed from the chiller member. A feature of the device is a scraper member disposed beneath the chiller member such that a longitudinal axis of the scraper member is parallel to the axis of rotation of the chiller member, a lateral axis of the scraper member is tangential to outer cylindrical wall of the chiller member, and a sharp edge of the scraper member engages the cylindrical wall of the chiller member. Another feature of the device is a collector trough disposed beneath the scraper member. An advantage of the device is that condensed grease is scraped from the cylindrical wall of the chiller member by the scraper member, whereupon, the removed grease falls downward past the scraper member and into the grease collector trough.

Another object of the present invention is to provide a device that forcibly discharges grease free cooker exhaust air to the atmosphere. A feature of the device is a blower for urging the combined grease carrying cooker exhaust air and cooling air from the mixing member and into the first end of the enclosure, through the apertures of the diffuser member, out the second end of the enclosure and into the atmosphere. An advantage of the device is that the blower can control air flow to ensure that all grease has been removed from the cooker exhaust air.

Another object of the present invention is to provide a device that provides a cooling fluid or liquid to the chiller member. A feature of the device is a refrigeration unit that supplies and controls the flow of the cooling fluid or liquid to the chiller member. An advantage of the device is that greater quantities of coolant can be supplied to the chiller member when greater amounts of cooker exhaust air or grease are directed to the device, thereby returning grease free cooker exhaust air to the atmosphere irrespective of the quantity of grease carried by the cooker exhaust air.

Another object of the present invention is to provide a device that removes grease from the grease collector trough disposed beneath the scraper member. A feature of the device is an auger centrally disposed in the collector trough such that the auger extends longitudinally through the entire length of the collector trough. An advantage of the device is that the auger facilitates the removal of all grease from the device, thereby preventing grease build-up and device failure, the removed grease ultimately being disposed via acceptable methods.

Another object of the present invention is to provide a system for removing particulate matter from heated air. A feature of the system is to cool the air. Another feature of the system is to distribute the cooled air uniformly upon a chilled surface. Still another feature of the system is to remove condensed particulate matter from the chilled surface. Yet another feature of the system is the separation of the removed particulate matter from the system. An advantage of the system is that air can be cleaned of particulate matter, then returned to the atmosphere.

Briefly, the invention provides a device for removing cooking grease from cooker exhaust air comprising a chiller member; a diffuser member having apertures therethrough, said diffuser member encasing said chiller member; means for enclosing said diffuser member and said chiller member encased in said diffuser member; means for combining grease carrying cooker exhaust air with cooling air; means for urging said combined grease carrying cooker exhaust air and cooling air through a first aperture in said enclosing means and said apertures in said diffuse member; means for cooling said chiller member to facilitate the removal of grease from said combined grease carrying cooker exhaust air and cooling air; a second aperture in said enclosing means for directing grease free cooker exhaust air and cooling air from said enclosing means; means for rotating said chiller member; and means for removing grease from said outer surface of said chiller member, whereby grease is continuously removed from cooker exhaust air before the cooker exhaust air is returned to atmosphere.

The invention further provides a system for removing cooking grease from cooker exhaust air comprising means for cooling the cooker exhaust air; means for urging the cooled cooker exhaust air through diffusing means; means for condensing the grease from the diffused cooker exhaust air; the condensed grease ultimately settling upon a chilled surface; means for removing the condensed grease from the chilled surface; and means for returning the de-greased cooker exhaust air to atmosphere.

The invention also provides a method for removing cooking grease from exhaust air from a cooker, said method comprising the steps of cooling the exhaust air; distributing the cooled exhaust air across a chilled surface thereby condensing the grease upon said chilled surface; removing the condensed grease from the chilled surface; and returning the grease free exhaust air to the atmosphere.

The invention further provides a method for removing particulate matter from heated air, said method comprising the steps of cooling the heated air; distributing the cooled air uniformly upon a chilled surface thereby condensing the particulate matter upon said chilled surface; returning the particulate free air to the atmosphere; removing the condensed particulate matter from said chilled surface; and disposing of the removed particulate matter.

BRIEF DESCRIPTION OF THE DRAWINGS

These and other objects, advantages and novel features of the present invention, as well as details of an illustrative embodiment thereof, will be more fully understood from the following detailed description and attached drawings, wherein:

FIG. 1 depicts a refrigeration unit via a block diagram, and an enclosure with an upper side portion removed thereby exposing a diffuser member and a chiller member therein.

FIG. 4 depicts a mixing member and the enclosure with top portions removed thereby exposing the diffuser member and the chiller member in the enclosure, and a plurality of staggered baffle plates in the mixing member.

FIG. 5 is a front, right portion elevation view of the device of FIG. 1, but without the refrigeration unit.

FIG. 6 is a top, left portion elevation view of the device of FIG. 4.

FIG. 7 is a front elevation view of a grease canister in accordance with the present invention.

FIG. 8 is a top elevation view of the grease canister of FIG. 8.

DESCRIPTION OF THE PREFERRED EMBODIMENT

Figure 1:
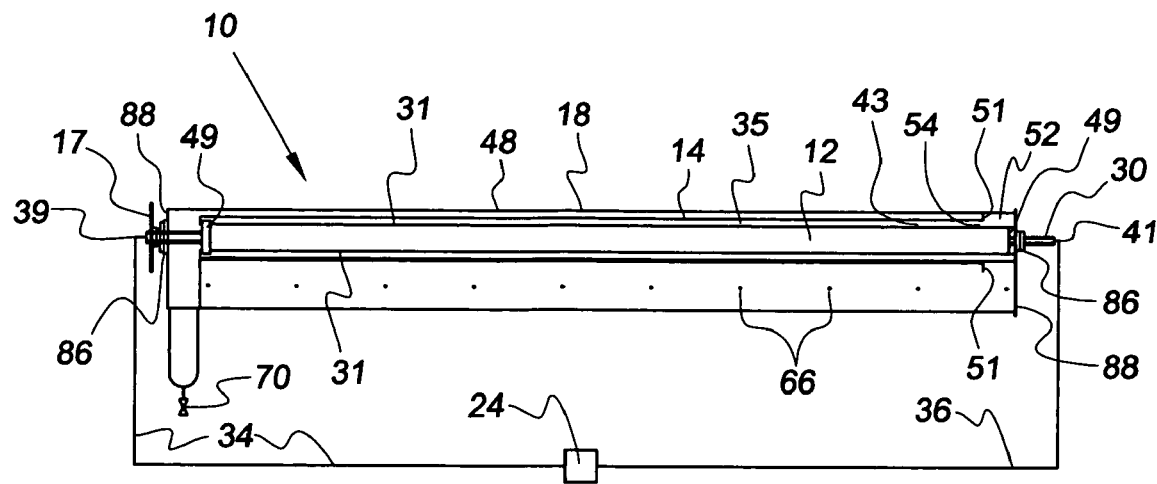
FIG. 1 is a front elevation view of a device (without a blower) for removing cooking grease from exhaust air from a cooker in accordance with the present invention.

Referring now to the drawings, a device for removing grease from exhaust air from a cooker in accordance with the present invention is denoted by numeral 10. The device 10 includes a chiller member 12, a diffuser member 14 having a plurality of apertures 16 therethrough, the diffuser member 14 encases the chiller member 12; an enclosure 18 for enclosing the diffuser member 14 and the chiller member 12 encased in the diffuser member 14; a mixing member 19 for combining grease carrying cooker exhaust air with cooling air provided by an air damper 20 secured to a first end portion 21 of the mixing member 19; a blower 22 for urging the combined grease carrying cooker exhaust air and cooling air from an open second end portion 25 of the mixing member 19 through a first aperture 23 in the enclosure 18, then through the apertures 16 of the diffuser member 14; a refrigeration unit 24 that provides cooling fluid to the chiller member 12 to facilitate the condensing and removal of grease from the combined grease carrying cooker exhaust air and cooling air, and to dispose the removed grease upon an outer surface of the chiller member 12; a second aperture 26 in the enclosure 18 for directing grease free cooker exhaust air and cooling air from the enclosure 18; a drive shaft 30 for rotating the chiller member 12; and a scraper member 32 for removing grease from the outer surface of the chiller member 12 as the rotating chiller member 12 is forcibly rotated via an electric motor (not depicted) coupled via a sprocket and chain assembly to an end portion of the enclosure 18. All members and connecting piping of the device 10 are covered with insulation to retain inside the device 10, the cold temperatures required to effectively operate the device 10.

Although the primary purpose for the device 10 is the removal of cooking grease from cooker exhaust air, the device 10 may be used for removing from air a myriad of items that will condense when exposed to sufficiently low temperatures. The items include but are not limited to chocolate and particulate matter in air or smoke such as volatile organic compounds well known to those of ordinary skill in the art.

The chiller member 12 is cylindrically configured with inner and outer cylindrical walls forming a relatively "thin" shell 31 and a relatively large cavity 33 therein. The chiller member 12 is fabricated from metal-preferably stainless steel, and orientated such that a central axis is disposed substantially horizontal, but with a slight downward slope from an input port 39 to an output port 41. The sloping cavity 33 promotes a refrigerant fluid flow such as 408A, which is provided by the refrigeration unit 24 via stainless steel input and output lines 34 and 36. The cooling fluid maintains the surface temperature of the chiller member 12 below freezing thereby promoting the condensation and removal of grease from the combined grease carrying cooker exhaust air and cooling air by depositing the grease upon the outer wall of the "frozen" shell 31 of the chiller member 12. To improve distribution of the refrigerant fluid though the cavity 33 in the chiller member 12, a rotating chiller auger 47 is snugly inserted into the chiller member 12 such that refrigerant fluid entering the chiller member 12 is uniformly urged to engage the inner wall of the shell 31 of the chiller member 12 thereby "freezing" all portions of the chiller member 12. The chiller auger 47 is sealed in the chiller member 12 via opposing end collars 49 which include central apertures to receive the end shafts 30 therethrough. The end shafts 30 support and rotate the chiller member 12 and the chiller auger 47 therein. Hub assemblies 86, well known to those of ordinary skill in the art, support the end shafts 30. Further, the end shafts 30 provide an input port 39 that promotes a cold liquid flow from the refrigeration unit 24 into the chiller member 12 via input line 34, and provide an output port 41 that promotes a cool gas flow from the chiller member 12 back to the refrigeration unit 24 via output line 36. The end shaft 30 coupled to the sprocket and chain assembly 17 promotes rotation of the chiller member 12 and chiller auger 47 from outside the enclosure 18 via the electric motor. The stationary input and output lines 34 and 36 are connected to the rotating end shafts 30 via rotating unions (not depicted) which allow rotating and stationary members to be joined thereby providing a "closed loop" for the cooling fluid.

The diffuser member 14 is a hollow, relatively thin shelled cylindrically configured container with an inner diameter substantially about fifty percent greater the outer diameter of the chiller member 12 that forms an inner cavity 35 configured to removably receive and promote rotation of the chiller member 12 within the diffuser member 14, and to facilitate sufficient grease carrying cooker exhaust air and cooling air flow through the apertures 16 of the diffuser member 14. The diffuser member 14 is fabricated from stainless steel, orientated such that a central axis is horizontally disposed, and longitudinally dimensioned to centrally encase the chiller member 12. The diffuser member 14 remains stationary and includes uniformly spaced apertures 16 with diameters of substantially about one inch. The quantity and spacing of the apertures 16 promote a predetermined quantity of combined grease carrying cooker exhaust air and cooling air flow through the diffuser member 14 shell and into the gap 43 between the diffuser 14 and chiller member 12. Further, the quantity and spacing of the apertures 16 result in the "filling" of the gap 43 with grease carrying air thereby promoting the condensing of the grease upon the chilled shell 31 of the chiller member 12.

The diffuser member 14 further includes a bottom portion with a scraper slot 44 extending parallel to the longitudinal axis of the diffuser member 14. The scraper slot 44 is configured and dimensioned to provide an opening in the bottom of the diffuser member 14 sufficiently large to allow all grease removed from the chiller member 12 to fall into a trough portion of the enclosure 18 beneath the chiller member 12. Further, the scraper slot 44 must be dimensioned to unobstructedly receive the scraper member 32 therethrough such that the scraper member 32 is vertically disposed with an edge portion 38 positioned substantially about one-half inch from a bottom portion of the outer wall of the shell 31 of the chiller member 12. The scraper slot 44 includes a longitudinal dimension relatively larger than the longitudinal dimension of the scraper member 32 to promote the collection of all grease scraped from the chiller member 12; the chiller member 12 including a longitudinal dimension relatively shorter than the longitudinal dimension of the scraper member 32 thereby promoting the removal of all grease from the chiller member 12.

The scraper member 32 is a substantially rectangular piece of vertically disposed stationary stainless steel having a relatively "sharp" edge portion 38 positioned proximate to the outer wall of the shell 31 of the chiller member 12 such that the edge portion 38 is separated from the shell 31 substantially about one-half inch thereby allowing a thin film of grease to build-up upon the surface of the shell to prevent frictional wear between the shell 31 and the edge portion 38 of the scraper member 32. The scraper member 32 continuously removes grease from the rotating chiller member 12 thereby promoting the continuous removal of grease from grease carrying cooker exhaust air and cooling air received from the mixing member 19. The scraper member 32 is disposed proximate to the outer wall of the shell 31 of the chiller member 12 via scraper adjusting member 68, which is a substantially "U" shaped channel of stainless steel relatively greater in longitudinal length than the scraper member 32, and multiple adjusting bolts 45 inserted through cooperating vertical slots (not depicted) in side portions of the scraper adjusting member 68. The adjusting bolts 45 slide up and down in the vertical slots to vertically adjust the distance separating the scraper member 32 from the bottom portion of the chiller member 12, after the scraper member 32 has been longitudinally aligned with and inserted through the scraper slot 44 of the diffuser member 14. To collect scraped grease from the chiller member 12, a collector trough 40 is disposed below and axially aligned with the chiller member 12 to "catch" grease falling from the chiller member 12. An aperture (not depicted) in a bottom portion 90 of the adjusting member 68 has a longitudinal dimension slightly longer than the longitudinal dimension of the scraper member 32, and a lateral dimension extending from the second wall 59 of the scraper member 32 to beneath the bolt and nut assembly 63; the longitudinal and lateral dimensions of the aperture cooperate with the scraper slot 44 to allow grease to fall into the collector trough 40.

Figure 2:
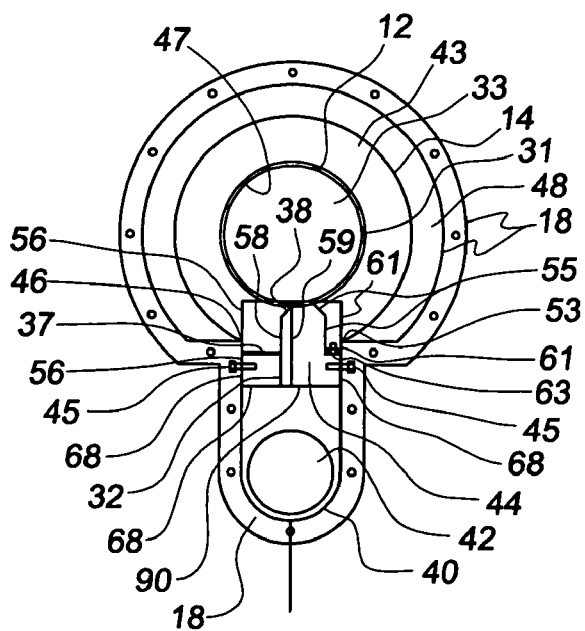
FIG. 2 is a right side elevation view of only the enclosure (without a right end collar, right end cover and shaft assembly) of the device of FIG. 1.
Figure 3:
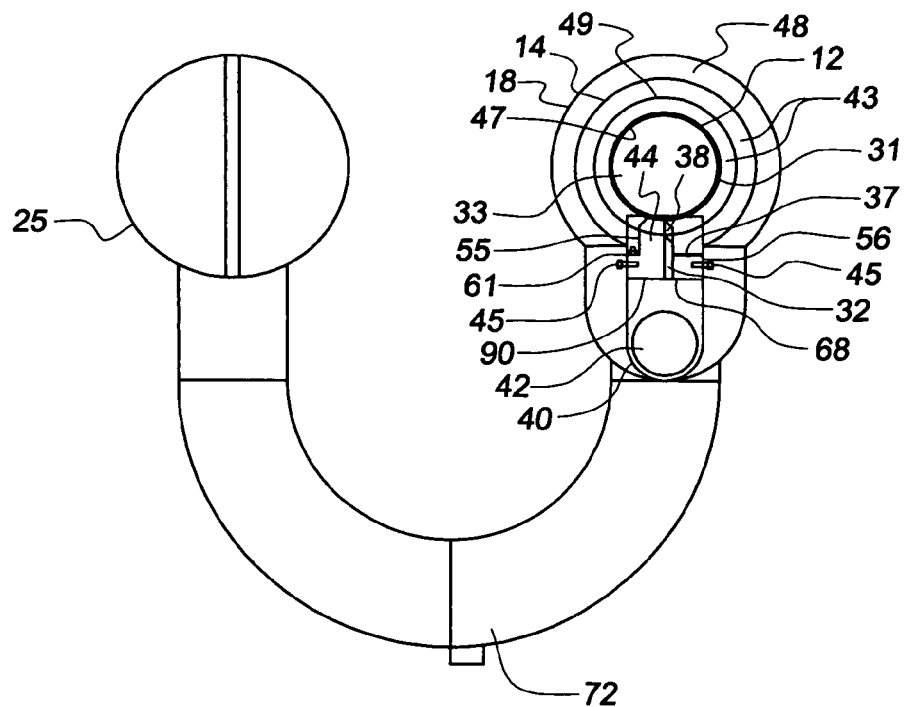
FIG. 3 is a left side elevation view of a mixing member and the enclosure (without a left end cover and shaft assembly) of the device of FIG. 1.
Figure 4:
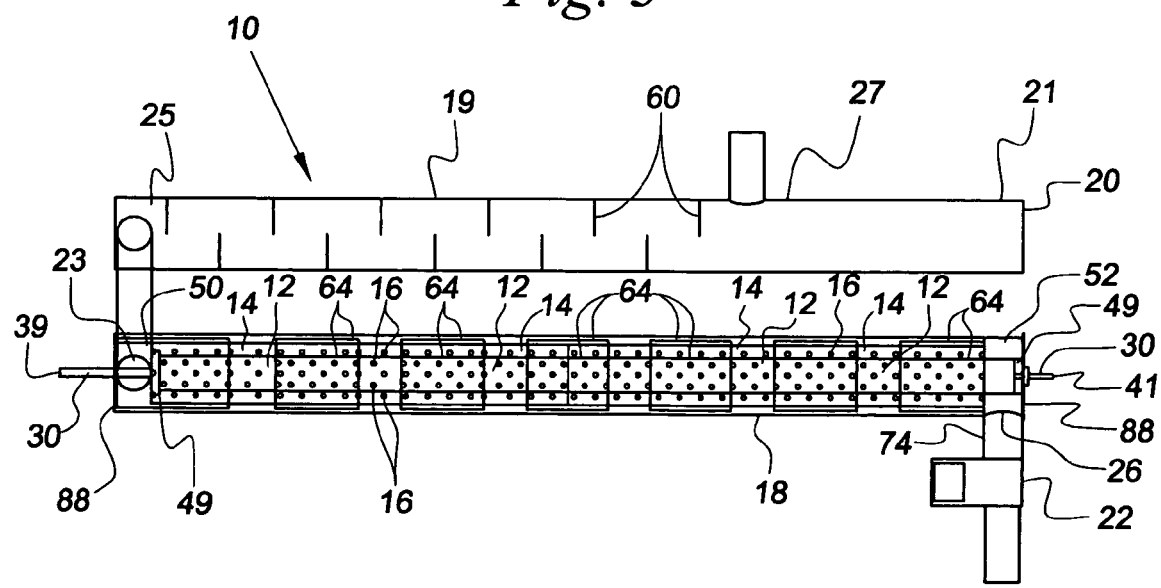
FIG. 4 is a top view of the device of FIG. 1, but with a blower portion and without the refrigeration unit in accordance with the present invention.

The grease collector trough 40 may be separated from or attached to the enclosure 18. The preferred arrangement is to attach the grease collector trough 40 to a bottom portion of the enclosure 18. The axial length of the grease collector trough 40 is relatively longer than the axial length of the freeze member 12 to catch all the grease scrapped from the freeze member 12. A motorized trough auger 42 is removably and rotatably inserted into the grease collector trough 40 to continuously remove the collected grease from the collector trough 40 and deposit the grease via a drain aperture (not depicted) in the bottom of the trough 40 into collection barrels (not depicted) for transporting to a disposal facility. The trough auger 42 is connected to an electric motor via a sprocket and chain assembly (not depicted) similar to the sprocket and chain assembly 17 (well known to those of ordinary skill in the art) that rotates the chiller member 12 an end shaft 30 clockwise, when taking a right side elevation view of the enclosure and chiller member 12 therein (see FIG. 2).

To prevent combined grease carrying cooker exhaust air and cooling air from "leaking" from the scraper slot 44 in the bottom of the diffuser member 14, a plate 37 of rigid stainless steel "plugs" a gap, which does not receive falling grease, between the scraper member 32 and a first edge 46 of the diffuser member 14. The plate 37 is secured to a first wall 56 of the scraper adjusting member 68 and a first wall 58 of the scraper member 32. Further, to completely separate the gap 43 from the scraper slot 44, a strip 55 of arcuate configured, spring stainless steel is secured to a protruding edge of a second wall 61 of the scraper adjusting member 68 via a bolt and nut assembly 63. The arcuate spring steel strip 55 allows the grease laden surface of the chiller member 12 to forcibly bend the arcuate portion of the strip 55 without grease being removed. The rotating chiller member 12 ultimately urges grease against the edge portion 38 of the scraper member 32, whereupon, grease is removed, then falls between a second wall 59 of the scraper member 32 and the strip 55 to the bottom of the grease collector trough 40, while the combined cooker exhaust and cooling air remain inside the gap 43 until being "sucked" from the enclosure 18 via the second aperture 26 by the force of the blower 22.

The grease collector trough 40 includes a series of scraper adjusting apertures 66 that are configured and axially aligned with the adjusting bolts 45, to allow a tool to engage and rotate the adjusting bolts 45 and ultimately elevate or lower the scraper adjusting member 68 and the scraper member 32 vertically secured thereto. The distance separating the edge 38 of the scraper member 32 and the surface of the shell 31 of the chiller member 12, is correspondingly decreased or increased to promote a "thinner" or "thicker" build-up of grease upon the chiller member 12 before the scraper member 32 begins removing the grease from the chiller member 12 thereby preventing damaging engagement between the chiller member 12 and the scraper member 32.

The enclosure 18 is a cylindrically configured, stainless steel tube having a cavity 48 with a diameter sufficient to removably receive the diffuser member 14, and to promote combined grease carrying cooker exhaust and damper air flow uniformly through all the apertures 16 in the diffuser member 14, thereby uniformly depositing grease upon the surface of the chiller member 12 inside the diffuser member 14. Generally, the diameter of the enclosure 18 is substantially about one-fourth longer than the diameter of the diffuser member 14, although combined cooker exhaust and damper air flow rates of varying quantities will require corresponding increases or reductions of the enclosure 18 diameter. To uniformly urge the combined air flow through all apertures 16 of the diffuser member 14, the first aperture 23 of the enclosure 18 is disposed at a first end portion 50, and air block wall 51 is disposed at a distal second end portion 52 of the enclosure 18. The first aperture 23 and air block wall 51 cooperate to allow the combined air to flow only through the apertures 16 of the diffuser member 14. The diffuser member 14 includes an end aperture 54 disposed adjacent to the second aperture 26 of the enclosure 18. The end aperture 54 allows grease free combined cooker exhaust and damper air to flow out of the cavity 35 of the diffuser member 14 and through the second aperture 26 of the enclosure 18 to ultimately be discharged to atmosphere via the blower 22. The second aperture 26 of the enclosure 18 is disposed at an opposite end and side of the enclosure 18 relative to the first aperture 23 resulting in the combined grease carrying cooker exhaust air and damper air flow more uniformly penetrating the diffuser member 14 and correspondingly depositing grease upon the surface of the freeze member 12, whereupon grease free air exits the diffuser member 14 via end aperture 54, then exists the enclosure 18 via second aperture 26, the grease free air then passing through the blower 22 to be forcibly discharged to atmosphere.

The enclosure 18 includes opposite end covers 88 and a series of removable inspection plates or covers 64 disposed to promote the visual inspection of the diffuser member 14 and chiller member 12 while inside the enclosure 18. The visual inspection reveals if the apertures 16 in the diffuser member 14 are becoming "plugged" with grease, or if an excessive amount of grease has accumulated upon the surface of the chiller member 12, either condition reduces the grease removing capability of the device 10. After inspecting the inside of the enclosure 18, appropriate maintenance is completed, then the covers 64 are re-attached.

The mixing member 19 is a cylindrically configured, stainless steel tube having a cavity that promotes the mixing of grease carrying cooker exhaust air with atmospheric or "outside" air provided by an air damper 20. The hot grease carrying cooker exhaust air and cooling air enter the mixing member 19 via inlet ports at a mid-portion 27 and the first end portion 21, respectively. The grease carrying cooker exhaust air is cooled when mixed with the cooling air throughout the longitudinal movement of the combined air inside the mixing member 19 until the combined grease carrying cooker exhaust air and cooling air exit the mixing member 19 via an aperture in the distal second end portion 25, whereupon, the combined "cooler" air enters the enclosure 18 via the first aperture 23. To more effectively "mix" grease carrying or laden cooker exhaust air and cooling air, a series of staggered, stainless steel baffle plates 60 are integrally joined to an inner cylindrical wall of the mixing member 19. The baffle plates 60 include opposing planar surfaces, each surface having an area substantially half the cross-sectional area of the mixing member 19. The baffle plates 60 are disposed between the inlet port at the mid-portion 27 and the second end portion 25 of mixing member 19 such that the baffle plates 60 are vertically positioned and perpendicular to the longitudinal axis of the mixing member 19 thereby forming two horizontal rows of staggered baffle plates that result in a relatively non-laminar or turbulent combined air flow that more effectively cools the hot grease carrying cooker exhaust air. The axial and diameter dimensions of the mixing member 19 will correspondingly vary with relatively larger or smaller cooker exhaust air systems.

The blower 22 is sized to urge the grease carrying cooker exhaust air and the cooling air through the mixing tube 19, into the enclosure 18, through the apertures 16 and into the inner cavity 35 of the diffuser member 14 irrespective of aperture 16 locations, and out of the enclosure 18 to be ultimately discharged to atmosphere. The sizing of the blower 22 is well known to those of ordinary skill in the art when the combined grease carrying cooker exhaust and cooling air flow rate is provided, together with the dimensions of the mixing member 19, enclosure 18, diffuser member 14 and apertures 16.

In operation, grease carrying cooker exhaust air and cooling air enter a mixing member 19, whereupon a blower 22 "sucks" the respective air flows through the mixing member 19 thereby mixing the air flows and cooling the grease laden cooker exhaust air. The combined grease laden cooker exhaust and cooling air flow exist the mixing member 19 (via piping sized pursuant to calculations well known to those of ordinary skill in the art) and enter an enclosure 18 having a cavity 48 that contains a diffuser member 14 and a chiller member 12 disposed within the diffuser member 14. The combined grease laden cooker exhaust and cooling air flow continues through a plurality of uniformly disposed apertures 16 in the diffuser member 14; the apertures 16 promoting the uniform distribution of the combined air flow throughout a gap 43 formed by the diffuser member 14 and the freezer member 12 therein. The chiller member 12 is chilled by a refrigeration unit 24 to a temperature that promotes the removal of grease from the combined air flow in the gap 43 by condensing the grease from the combined air flow upon the surface of the chiller member 12. The grease free air flow continues out of the diffuser member 14, then out of the enclosure 18 (via appropriately sized piping), and through the blower 22, whereupon, the grease free air is discharged to atmosphere via a vent stack (not depicted). The grease condensed upon the surface of the chiller member 12 is removed via a scraper member 32 engaging a bottom portion of the chiller member 12. The "scraped off" grease falls into a grease collector trough 40, whereupon, an auger 42 inserted into the trough 40 rotatably removes the grease from the trough 40 and disposes the grease into barrels that are ultimately transported to a grease processing facility, thereby promoting the continuous removal of grease from cooker exhaust air before the cooker exhaust air is returned to atmosphere via the blower 22.

Although scraping grease from the chiller member 12 is the preferred method of removing condensed grease from the device 10, a surprising and unexpected method of increasing the quantity of condensed grease removed from the device 10 is to dispose multiple grease drain valves 70 (manual or motor operated) at preselected piping "low points" or "valleys" 72 in the piped portion of the device 10. More specifically, grease drain valves 70 are attached to a bottom portion of the piping low points 72 to allow an individual to drain water and condensed grease from the device 10 into buckets that are carried to a temporary storage tank, whereupon, the contents of the buckets are dumped into the storage tank which is ultimately drained by a suction truck.

Referring now to FIG. 8, occasionally, excess quantities of grease remain in the cooker exhaust air returned to atmosphere. To reduce these quantities of grease to acceptable levels, a grease canister 73 is included in the exhaust air pipe 74 that extends from the enclosure 18 to the blower 22. The grease canister 73 is cylindrically configured with cooperating diameter and axial dimensions that facilitate a substantial reduction of temperature of combined cooker exhaust air and cooling air after the combined air exists the enclosure 18 and flows through the grease canister 73. The diameter of the grease canister 73 is much greater than the diameter of the attached exhaust air pipe 74 thereby providing an enlarged cavity that promotes a pressure drop and corresponding reduction in air flow which results in decreasing air temperature. The lower air temperature inside the grease canister 73 causes the grease in the air to condense and fall to the bottom of the grease canister 73. The grease canister 73 includes planar top and bottom walls 76 and 78, a bottom aperture (disposed slightly above the bottom wall 78) in a first side portion 80 of the canister 73, the bottom aperture tightly receiving a first portion of the exhaust air pipe 74 such that air leaks are prevented, a top aperture (disposed slightly below the top wall 76) in a second side portion 82 of the canister 73, the top aperture tightly receiving a second portion of the exhaust air pipe 74 which extends to an intake portion of the blower 22, and a grease drain valve 70 that, when opened, drains water and condensed grease collected in a bottom portion of the grease canister 73 into a bucket.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A device for removing cooking grease from cooker exhaust air comprising:
   a chiller member;
   a diffuser member having apertures therethrough, said diffuser member encasing said chiller member;
   means for enclosing said diffuser member and said chiller member encased in said diffuser member;
   means for combining grease carrying cooker exhaust air with cooling air;
   means for urging said combined grease carrying cooker exhaust air and cooling air through a first aperture in said enclosing means and said apertures in said diffuser member;
   means for cooling said chiller member to facilitate the removal of grease from said combined grease carrying cooker exhaust air and cooling air;
   a second aperture in said enclosing means for directing grease free cooker exhaust air and cooling air from said enclosing means;
   means for rotating said chiller member; and
   means for removing grease from said outer surface of said chiller member whereby grease is continuously removed from cooker exhaust air before the cooker exhaust air is returned to atmosphere.

2. The device of claim 1 wherein said chiller member is cylindrically configured.

3. The device of claim 1 wherein said chiller member includes a horizontally orientated central axis.

4. The device of claim 1 wherein said diffuser member is stationary.

5. The device of claim 1 wherein said diffuser member is cylindrically configured.

6. The device of claim 1 wherein said diffuser member apertures are substantially about one inch in diameter.

7. The device of claim 1 wherein said diffuser member includes an inner diameter substantially about double the diameter of said chiller member.

8. The device of claim 1 wherein said combining means includes a mixing tube.

9. The device of claim 1 wherein said grease carrying air directing means includes a blower that urges said combined grease carrying cooker exhaust air and damper air through said diffuser member apertures and into an inner cavity of said diffuser member.

10. The device of claim 1 wherein said condensing means includes a refrigeration system that provides cooling fluid to predetermined portions of said chiller member.

11. The device of claim 1 wherein said grease free air directing means includes an air discharge aperture through an end portion of said diffuser member that allows the flow of said grease free air from said inner cavity of said diffuser member to atmosphere.

12. The device of claim 1 wherein said rotating means includes an electric motor coupled to a drive shaft portion of said chiller member.

13. The device of claim 1 wherein said grease removing means includes a scraper member that engages said outer surface of said chiller member thereby scraping grease from said chiller member.

14. The device of claim 13 wherein said grease removing means includes a grease collector trough disposed below and longitudinally aligned with said chiller member such that grease scraped from said chiller member falls into said grease collector trough.

15. The device of claim 14 wherein said grease removing means includes an auger longitudinally and snugly disposed in said grease collector trough such that when said auger is rotated, grease is continuously removed from said grease collector trough and disposed in collection barrels for transporting.

16. A system for removing cooking grease from cooker exhaust air comprising:
   means for cooling the cooker exhaust air;
   means for urging the cooled cooker exhaust air through diffusing means;
   means for condensing the grease from the diffused cooker exhaust air, the condensed grease ultimately settling upon a chilled surface, said condensing means including a chiller member inserted into said diffusing means, said chiller member includes a rotatable cylinder that receives a cooling fluid therethrough;
   means for removing the condensed grease from the chilled surface; and
   means for returning the de-greased cooker exhaust air to atmosphere.

17. The system of claim 16 wherein said cooling means includes a damper for mixing atmospheric air with the cooking exhaust air.

18. The system of claim 16 wherein said condensing means includes a grease canister.

19. The system of claim 18 wherein said grease canister is disposed in an exhaust air conduit.

20. A system for removing cooking grease from cooker exhaust air comprising:
   means for cooling the cooker exhaust air;
   means for urging the cooled cooker exhaust air through diffusing means;
   means for condensing the grease from the diffused cooker exhaust air, the condensed grease ultimately settling upon a chilled surface, said condensing means including a grease canister, said grease canister is disposed in an exhaust air conduit, said grease canister including a cavity that promotes a relatively large pressure drop and corresponding reduction in air flow that decreases air temperature, thereby facilitating the condensation and removal of grease from air;
   means for removing the condensed grease from the chilled surface; and
   means for returning the de-greased cooker exhaust air to atmosphere.

21. A method for removing cooking grease from exhaust air from a cooker, said method comprising the steps of:
   cooling the exhaust air;
   distributing the cooled exhaust air via diffusing means across a rotating chiller member that receives a cooling fluid therethrough and is disposed within said diffusing means thereby condensing the grease upon said chiller member;
   removing the condensed grease from said chiller member; and
   returning the grease free exhaust air to the atmosphere.

22. A method for removing particulate matter from heated air, said method comprising the steps of:
   distributing the heated air uniformly via diffusing means upon a rotating chiller member that receives a cooling fluid therethrough and is disposed within said diffusing means thereby condensing the particulate matter upon said chiller member;
   directing the cooled air through a relatively large cavity;
   returning the particulate free air to the atmosphere;
   removing the condensed particulate matter from said chiller member; and
   disposing the removed particulate matter.

23. The method of claim 22 wherein said step of directing the cooled air through a relatively large cavity includes the step of providing a canister to further remove particulate matter from the cooled air prior to the cooled air being returned to atmosphere.

* * * * *